though end wall 12. The vortex finder

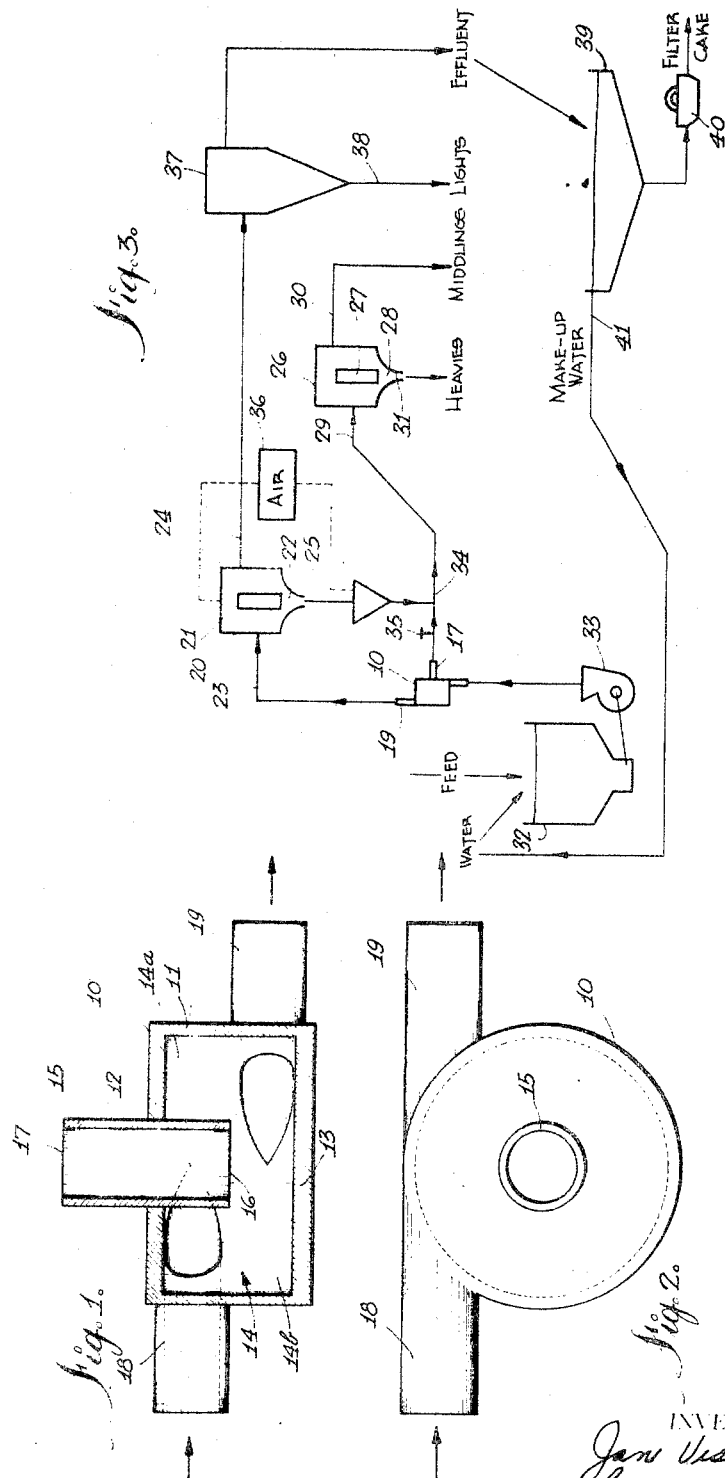

United States Patent Office 3,487,923
Patented Jan. 6, 1970

3,487,923
APPARATUS FOR SEPARATING AQUEOUS SUSPENSIONS OF SOLID PARTICLES
Jan Visman and Lawson S. Sims, Edmonton, Alberta, Canada, assignors to Canadian Patents and Development Limited, Ottawa, Ontario, Canada, a company of Canada
Filed Aug. 28, 1968, Ser. No. 755,960
Int. Cl. B03d 3/00; B03b 1/00
U.S. Cl. 209—3                1 Claim

ABSTRACT OF THE DISCLOSURE

An apparatus for separating mixtures of solid particles in aqueous slurry employs a pulp divider comprising walls forming a cylindrical chamber, a vortex finder axially arranged in the chamber and forming an annular portion thereof, an inlet for feed slurry leading into the annular portion, and a slurry outlet leading from the remaining portion of the chamber. Relatively clean water flows from the outlet end of the vortex finder. The divider slurry outlet is connected to the inlet of a primary hydrocyclone and the divider vortex finder is connected to feed the primary hydrocyclone apex discharge to the inlet of a secondary hydrocyclone.

BACKGROUND OF THE INVENTION

Field of the invention

The invention is in the general field of cyclone separation of solid particles in aqueous suspension and in the specific field of cyclone devices for dividing said suspension into separate streams of different densities.

Description of the prior art

Cyclone separators have heretofore been employed for providing a source of clean liquid from a suspension of solid particles but such devices operate under relatively high pressure and have a relatively complicated chamber configuration.

SUMMARY OF THE INVENTION

The invention resides in a pulp divider comprising a vessel having a cylindrical chamber of generally uniform diameter therein. A vortex finder extends axially into one end of the chamber and forms an annular portion of the chamber. A slurry inlet extends tangentially into such annular portion of the chamber. A slurry outlet extends tangentially from the remaining portion of the chamber. The vortex finder has an outlet for relatively clean water outside the chamber. The device is of substantial advantage in a two-stage cyclone separation apparatus in that it eliminates the need for a second slurry pump in the second stage of the apparatus.

BRIEF DESCRIPTION OF THE DRAWING

FIGURE 1 is a sectional elevation of a cyclone device in accordance with the invention,
FIGURE 2 is a plan view of the device shown in FIGURE 1, and
FIGURE 3 is a diagrammatic illustration of a cyclone separation apparatus incorporating the present invention.

DESCRIPTION OF THE PREFERRED EMBODIMENT

Referring to FIGURES 1 and 2, the cyclone device or pulp divider shown comprises a vessel 10 having a right cylindrical side wall 11 and end walls 12 and 13 forming a chamber 14. A tubular vortex finder 15 extends axially into the chamber through end wall 12. The vortex finder has an inlet end 16 in the chamber and an outlet end 17 externally of the chamber. In the modification shown, the inlet end 16 is disposed in the midsection of the chamber between walls 12 and 13.

The vortex finder divides the chamber 14 into an annular portion 14a and a remaining portion 14b of uninterrupted cylindrical shape.

An inlet pipe 18 for feed slurry extends tangentially through wall 11 with its opening communicating with chamber portion 14a. An outlet pipe 19 for discharged slurry extends tangentially through wall 11 with its opening communicating with chamber portion 14b.

FIGURE 3 illustrates diagrammatically an operative example of an apparatus utilizing the present invention. This apparatus may be used for cleaning fine coal and ore pulps in watery suspension. The apparatus involves the use of a first cyclone 20 having therein a vortex finder 21, a conical settling zone 22, and slurry inlet 23, an upper discharge 24, and an apex discharge passage 25 leading from the settling zone. A second cyclone 26, of structure similar to that of 20, also has a vortex finder 27, a conical settling zone 28, a slurry inlet 29, an upper discharge 30, and an apex discharge passage 31. Each cyclone is of the type described in United States Patent 3,353,673, dated Nov. 21, 1967.

The feed material and water is fed to a hopper 32 from which it is pumped by means of pump 33 to the inlet 18 of a pulp divider in the circuit. The divider provides a relatively high pressure flow of a fraction of the slurry containing solids of, for example, about 50%, from outlet 19 to the inlet 23 of cyclone 20. The divider also provides a flow of substantially clean water (with a trace of solids) under about half the inlet pressure from vortex finder outlet 17 to the slurry inlet 29 of cyclone 26 through a line 34 to which is connected the discharge passage 25 of cyclone 20. Preferably, a pressure controlling valve 35 is included in line 34 adjacent outlet 17.

Compressed air may be supplied to the vortex of cyclone 20 as indicated at 36.

A dewatering cyclone 37 is included in the circuit. As shown, a heavy fraction is discharged from the apex of cyclone 26, and middlings from the discharge outlet 30. The light fraction from outlet 24 of cyclone 20 is dewatered in cyclone 37 and recovered at 38. The effluent from cyclone 37 is collected in vessel 39 and subjected to a filtration treatment at 40. Make-up water for the feed may be provided from the effluent as indicated at 41.

In the apparatus of FIGURE 3, use of the pulp divider eliminates the need for a second pump which would be required for supplying make-up water with the apex under a back pressure about one-half of the inlet pressure. served that, in accordance with the present invention, the cylindrical chamber of the pulp divider receives at one end the full stream discharging from the feed pump 33. This stream of suspended solids is separated into two streams, one containing substantially all the solids and discharging tangentially from the opposite end of the cylindrical chamber under a back pressure slightly lower than the inlet pressure to the cyclone; and a second stream leaving the chamber centrally through the vortex finder, under a back pressure about one-half of the inlet pressure. The pulp divider thus separates a stream of substantially clean water from the infed stream while maintaining sufficient back pressure on it and the stream carrying the bulk of the solids. Therefore, both discharge streams exit under pressure sufficiently high for operating both the primary and secondary stage cyclones 20 and 26.

The quality of the end product in a system such as illustrated in FIGURE 3 is not reduced, while at the same time a considerable reduction in the cost of the system and its operation is achieved. No recirculation of solids through a pump is required and the pulp divider described operates at a pressure lower than that required to operate a conventional classifier cyclone of the same capacity.

We claim:

1. Apparatus for separating mixtures of solid particles in an aqueous slurry which comprises a pump having an outlet for feeding said slurry, a pulp divider comprising a vessel having a substantially cylindrical side wall and first and second end walls forming a substantially cylindrical chamber, a tubular vortex finder extending axially into said chamber through said first end wall, a slurry inlet pipe extending tangentially into said chamber through said side wall adjacent said first end wall and being connected to said pump outlet for reception of the total slurry output of said pump, and an outlet pipe extending tangentially from said chamber through said side wall adjacent said second end wall for output under pressure of concentrated slurry containing substantially all the solids in said feed slurry, said vortex finder having an outlet externally of said chamber for output under pressure of a substantially clean water fraction from said slurry, said chamber being otherwise closed, first and second cyclones each having a vortex finder, a slurry inlet, a conical settling zone, a discharge outlet communicating with said cyclone vortex finder, and a discharge passage leading from said settling zone, said inlet of said first cyclone being connected to said chamber outlet pipe for reception of said concentrated slurry, said inlet of said second cyclone being connected to said discharge passage of said first cyclone for second stage treatment in said second cyclone of material discharged from said first cyclone, said second cyclone inlet being also connected to said pulp divider vortex finder outlet for supply of make-up water under pressure to said second cyclone.

References Cited

UNITED STATES PATENTS

| 819,171 | 5/1906 | Robinson | 209—144 |
|---|---|---|---|
| 2,377,524 | 6/1945 | Samson | 209—211 |
| 2,700,468 | 1/1955 | Fontein | 209—211 |
| 2,799,208 | 7/1957 | Scott | 209—211 |
| 2,849,117 | 8/1958 | Rietema | 209—211 |
| 2,910,178 | 10/1959 | Bonneau | 209—211 X |
| 3,084,798 | 4/1963 | Lau | 209—211 X |
| 3,353,673 | 11/1967 | Visman | 209—211 |

OTHER REFERENCES

Mining Engineering, Development of the Hydrocyclone, Erickson, pp. 869–872, August 1957.

FRANK W. LUTTER, Primary Examiner

U.S. Cl. X.R.

209—211; 210—512